Patented May 24, 1938

2,118,244

UNITED STATES PATENT OFFICE 2,118,244

SYMMETRICAL DI(AMINOQUINOLYL-6)-UREAS

Heinrich Jensch, Frankfort-on-the-Main, Germany, assignor to Winthrop Chemical Company, Inc., New York, N. Y., a corporation of New York No Drawing. Application February 8, 1934, Serial No. 710,378. In Germany February 8, 1933

1 Claim. (Cl. 260—41)

The present invention relates to symmetrical di(aminoquinolyl-6)-ureas.

I have found that compounds of the following formula:

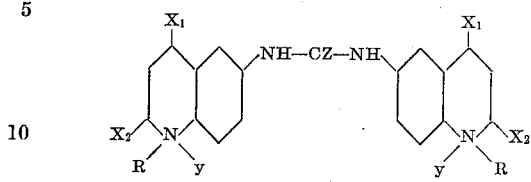

in which $X_1$ stands for an amino or alkylamino group or for hydrogen, $X_2$ stands for an amino or alkyl-amino group, methyl or hydrogen, at least one X being amino or alkylamino, $y$ stands for the anion of a strong mineral acid, R stands for alkyl or aralkyl, and Z stands for oxygen or sulfur have an excellent therapeutical action, particularly tissue-disinfecting properties. These compounds may be prepared by causing the diaminoquinolines and the derivatives thereof, mentioned in the co-pending U. S. application Serial No. 653,192, filed January 23, 1933, to act upon phosgene, thiophosgene or carbon disulfide and sulfur and by rendering quaternary the two nuclear nitrogen atoms of the quinoline rings. As parent materials for these compounds there may, for instance, be used: 4.6-diaminoquinaldine, 4.6-diaminoquinoline, 2.6-diaminoquinoline, 4-methylamino-6-aminoquinoline, 4-ethylamino-6-aminoquinaldine, 2-methylamino-6-aminoquinoline. To the nuclear nitrogen atoms of the quinoline rings there may be added methyl chloride, ethyl chloride, propyl chloride, benzyl chloride. The products thus obtained are solid and soluble in water.

The following examples illustrate the invention, but they are not intended to limit it thereto:

1. 7.5 grams of symmetrical di-(2-methyl-4-aminoquinolyl-6)-urea (obtainable according to Example 10 of the co-pending U. S. application Serial No. 653,192, filed January 23, 1933 in 50 cc. of methanol are gradually mixed with 5.2 grams of dimethylsulfate, while heating on the water bath. After a short time dissolution occurs. On further heating the solution there is precipitated therefrom the diquaternary salt which, after cooling, is filtered with suction and dissolved in hot water. After the solution has been acidified with hydrochloric acid, there is added saturated sodium chloride solution. The dichloromethylate which separates during this process is filtered with suction after cooling and then washed with dilute hydrochloric acid and acetone. The yield amounts to 8.5 grams. The salt is rather readily soluble in water. It melts at 300° C., while foaming. The solutions are not precipitated by ammonia, contrary to those of the tertiary base. By a small quantity of dilute caustic soda solution a colorless precipitate is produced which, on heating, assumes a yellow color. An excess of strong caustic soda solution immediately produces already in the cold a yellow precipitate.

2. From 4.6-diaminoquinaldine (Example 1 of the co-pending U. S. application referred to in the preceding example) there is obtained, either by the reaction in acetonic solution with thiophosgene or by boiling in an alcoholic solution with carbon disulfide and sulfur, the symmetrical di-(4-aminoquinaldyl-6)-thiourea, a practically colorless powder which fuses at 180° C., while foaming and becoming yellow. 12 grams thereof in 80 cc. of methanol are mixed, drop by drop, with 7.6 grams of dimethylsulfate, while gently heating in the water bath, dissolution occurring. On addition of ether the addition product precipitates first in the form of a resin which, later on, becomes solid. This product is absorbed in water and reprecipitated in the form of the base by addition of alkali. The base is mixed in an alcoholic solution with alcoholic hydrochloric acid and the dichloromethylate of the aforenamed thiourea is precipitated by addition of acetone. It is a yellowish-grey powder which is readily soluble in water and readily salted out by means of sodium chloride. The yield amounts to 12 grams. After purification by recrystallization from alcohol there is obtained a nearly colorless powder which after elimination of water, while foaming at 110° C., gradually decomposes above 200° C., while becoming brown.

3. If 2.6-diaminoquinoline (Example 7 of the co-pending U. S. application mentioned above) is treated with phosgene in the same manner as described in Example 10 of the said U. S. application, there is obtained the symmetrical di-(2-aminochinolyl-6)-urea in the form of a grey powder, sparingly soluble in the usual organic solvents; the powder melts at 291° C. with decomposition. 7 grams thereof in 35 cc. of methanol are gradually mixed at boiling temperature with 5.2 grams of dimethyl sulfate. Dissolution occurs after a boiling of about ¼ hour. On cooling, a resinous precipitation of the addition product is obtained which becomes solid on kneading it with ether. The product is dissolved in water, the solution obtained is filtered, the hot filtrate is combined with hydrochloric acid and mixed with sodium chloride solution. During this operation the greyish-yellow dichloromethylate is precipitated in a quantity of 8.1 grams which are washed with dilute hydrochloric acid. It does not change when being heated up to 300° C.; it dissolves in a large quantity of methanol on quickly heating it and is soon transformed in a hardly soluble product even when being boiled therein. It is readily soluble in water. According to the analysis it contains 1½ mols of water.

I claim:

The product of the following formula:

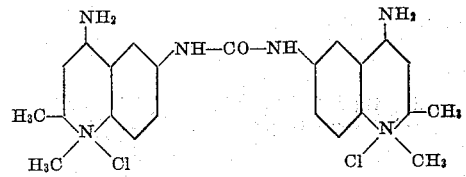

said product being solid and soluble in water.

HEINRICH JENSCH.